Patented Oct. 27, 1942

2,299,951

UNITED STATES PATENT OFFICE 2,299,951

CHEESE PACKAGE

James D. Ingle, Chicago, Ill., assignor to Industrial Patents Corporation, Chicago, Ill., a corporation of Delaware No Drawing. Application August 3, 1940, Serial No. 351,267

4 Claims. (Cl. 260—734)

This invention relates to a waxy composition suitable for coatings and the like.

More particularly the invention has to do with a wax-like composition made from wax and rubber resin. The composition of the invention is particularly adapted for the coating of cheese or the manufacture of a cheese package. The composition is also suitable for other purposes including the moistureproofing of papers and cartons, and the coating and packaging of foods, and the manufacturing of various food containers.

In the manufacture and storage of certain foods it is necessary to coat or to wrap the material to exclude air and moisture, whereby aging or curing may take place without substantial alteration of the moisture content or without spoilage from atmospheric contamination. The materials used for this purpose must not taint or contaminate the food product and must form a moistureproof coating which will withstand the wide fluctuation of temperatures encountered in refrigeration and storage without cracking or chipping.

An object of the present invention is to provide a waxy composition which will be flexible at temperatures ranging from as high as approximately the softening point to as low as a minus 30 degrees F.

Another object of the invention is to prepare a waxy composition which is amorphous and more elastic than those made from crystalline waxes.

It has been found that an improved composition suitable for use in the manufacture of protective coatings for materials such as foods, particularly cheese, may be prepared by using a mixture containing a high melting point or amorphous petroleum wax and sufficient rubber resin to impart increased flexibility and elasticity thereto. A high melting point or amorphous petroleum wax or a plurality of such waxes of different melting points may be used. A crystalline paraffin wax such as petroleum scale wax may be used along with the amorphous wax.

It has been proposed heretofore to manufacture wax-like compositions from a rubber resin and wax. For example, United States Patent, No. 2,050,209, August 4, 1936, discloses a mixture containing from 15 per cent to 60 per cent of a rubber resin and 20 to 75 per cent of scale petroleum wax. Such a composition, containing no high melting point or amorphous petroleum waxes, fails to have the properties inherent in the product of the present invention, particularly in the failure to have an elasticity and flexibility over wide temperature ranges.

A mixture of a high melting point amorphous wax and a crystalline or scale petroleum wax is disclosed in United States Patent, No. 2,102,516, December 14, 1937. This material, containing no rubber resin, is different from the product herein disclosed, particularly in being inferior in flexibility, elasticity and toughness, especially at low temperatures.

The amorphous waxes which may be used are special products of higher melting point than ordinary paraffin or scale wax. They are composed of a mixture of hydrocarbons of varying melting points. Commercial products which are suitable have melting points of around 140 degrees F. and 160 degrees F. One or more of these may be used. It is often advantageous to use also some paraffin or scale wax, such as a commercial product of about 122 degrees to 126 degrees F. melting point. For example, a wax base containing about equal amounts of amorphous waxes of about 140 degrees F. and 160 degrees F., respectively, and about an equal amount of crystalline paraffin wax of about 126 degrees F. melting point has been found to be particularly satisfactory.

The rubber resin is a condensation derivative of unvulcanized rubber. This product may be produced by treating chilled crepe rubber with condensing agents; for example, the halides of amphoteric metals, such as tin tetrachloride, ferric chloride, etc., or a compound such as chlorostannic acid. The method of preparing the resin compound is well known in the art. Suitable compounds may be prepared as described in United States Patent, No. 2,052,423, August 25, 1936. When using amorphous petroleum wax of melting point in the range of about 140 degrees to 160 degrees F. not in excess of about 15 per cent of the rubber resin is ordinarily required. For example, about 5 to 15 per cent of the rubber resin is sufficient to impart to amorphous wax improved elasticity and flexibility.

For the purpose of illustrating the invention an example of a preferred composition is given below:

| | Per cent |
|---|---|
| Rubber resin | 8 |
| Amorphous petroleum wax, M. P. 140° F. | 22 |
| Amorphous petroleum wax, M. P. 160° F. | 20 |
| Crystalline paraffin wax, M. P. 126° F. | 50 |

The waxes and resin may be melted before or after mixing and the molten mass stirred to obtain a uniform mixture. The product is then ready for use.

The molten product may be used to impregnate or coat any paper or cardboard. It may also be used as a coating by direct application to food products.

In the treatment of cheese a carton may be coated with the material and thereafter the treated carton filled with the cheese. A mixture of amorphous waxes and paraffin or any other type of thermoplastic material which is liquid at about 190 degrees F. may be then poured on the top of the cheese. The pouring in of such a mixture excludes all air from the cheese surface and holds it to the sides of the container.

The processing of the cheese may also be conducted by merely dipping the cheese, usually bandaged, in the molten coating composition, after which the cheese is chilled and allowed to cure.

The composition of the present invention is different from coatings of the prior art not only in composition, but also in certain distinctive properties. It is softer and more flexible at temperatures around 45 degrees F. than those in which the rubber resin is used with ordinary paraffin or scale wax. It is also more elastic and flexible at temperatures as low as a minus 30 degrees F. than mixtures of scale wax and amorphous wax in which no rubber resin is present. Moreover the resin unexpectedly reduces the shrink or contraction of the wax on solidification from the liquid state and softens the resulting mass even though it raises the melting point thereof.

The term "rubber resin" as used in the claims relates to any rubber condensation product obtained by treatment of crepe rubber with a condensing agent, for example, a halide of amphoteric metal, such as tin tetrachloride, ferric chloride, etc., or with a compound such as chlorostannic acid, and decomposing the resulting product with water.

Obviously many modifications and variations of the invention hereinbefore set forth may be made without departing from the spirit and scope thereof, and therefore only such limitations should be imposed as are indicated in the appended claims.

I claim:

1. A waxy coating composition suitable for dipping cheese comprising essentially about 50 per cent of crystalline petroleum wax, about 5 to 15 per cent of rubber resin obtained by condensing rubber in the presence of chlorostannic acid or a halide of an amphoteric metal, and the remainder a high melting point amorphous petroleum wax.

2. A waxy coating composition suitable for dipping cheese comprising essentially about equal amounts of a crystalline petroleum wax and an amorphous petroleum wax of melting point of about 140° to 160° F. and between about 5 and 15 per cent rubber resin obtained by condensing rubber in the presence of chlorostannic acid or a halide of an amphoteric metal, said coating composition being elastic and flexible over a wide temperature range.

3. A waxy coating composition comprising essentially about 40 per cent of about equal amounts of amorphous petroleum waxes of melting points of about 140° and 160° F. respectively, about 50 per cent of crystalline petroleum wax and the remainder rubber resin obtained by condensing rubber in the presence of chlorostannic acid or a halide of an amphoteric metal, said coating composition being particularly suitable for dipping cheese to produce an adherent coating which is elastic and flexible over a wide range of temperature.

4. A waxy composition adapted for coating cheese comprising essentially about 50 per cent of paraffin wax of about 126° F. melting point, about 22 per cent of amorphous petroleum wax of about 140° F. melting point, about 20 per cent amorphous petroleum wax of about 160° F. melting point and about 8 per cent rubber resin obtained by condensing rubber in the presence of chlorostannic acid or a halide of an amphoteric metal.

JAMES D. INGLE.